United States Patent [19]

Wright et al.

[11] 4,053,646

[45] Oct. 11, 1977

[54] WATER STABLE STARCH-LIPID COMPOSITION AND METHOD FOR PREPARING SAME

[75] Inventors: Walton Reid Wright; Albert E. Purcell, both of Raleigh, N.C.

[73] Assignee: Walton Reid Wright, Raleigh, N.C.

[21] Appl. No.: 575,603

[22] Filed: May 8, 1975

Related U.S. Application Data

[63] Continuation-in-part of Ser. No. 262,735, June 14, 1972, abandoned.

[51] Int. Cl.² .............................................. A23K 1/00
[52] U.S. Cl. .......................................... 426/62; 426/98; 426/641; 426/643; 426/644; 426/647; 426/656; 426/661; 426/805
[58] Field of Search ............................... 127/29, 70, 71; 426/805, 607, 99, 62

[56] References Cited

U.S. PATENT DOCUMENTS

| | | | |
|---|---|---|---|
| 1,083,769 | 1/1914 | Suzuki | 426/805 |
| 1,431,938 | 10/1922 | Dunham | 426/99 |
| 1,432,057 | 10/1922 | Dunham | 426/607 |
| 2,371,682 | 3/1945 | Eisaman | 426/805 |
| 2,385,068 | 9/1945 | Eshbaugh | 426/452 |
| 2,554,143 | 5/1951 | Hinz | 426/579 |
| 3,257,213 | 6/1966 | Colby | 426/555 |
| 3,300,319 | 1/1967 | Marotta | 426/589 |
| 3,483,002 | 12/1969 | Stein | 426/540 |
| 3,499,962 | 3/1970 | Wurzburg | 426/98 |
| 3,518,092 | 6/1970 | Rock | 426/658 |
| Re. 16,915 | 3/1928 | Yudowitch | 426/613 |

*Primary Examiner*—Sidney Marantz
*Attorney, Agent, or Firm*—George H. Mortimer

[57] ABSTRACT

A composition comprising starch and lipid characterized by immobility of the lipid in water. A preferred embodiment is a high fat fish food particularly adapted for use as diet of aquarium fish which is prepared from at least one lipid material and starch, advantageously supplemented by further nutrient materials and/or flavoring constituents. The lipid and the starch are so intimately associated with one another in the composition that the lipid component is immobilized, i.e., is not separated from the composition on placing it in water.

22 Claims, No Drawings

WATER STABLE STARCH-LIPID COMPOSITION AND METHOD FOR PREPARING SAME

INTRODUCTION

A non-exclusive, irrevocable, royalty-free license in the invention herein described throughout the world for all purposes of the United States Government, with the power to grant sublicenses for such purposes, is hereby granted to the Government of the Unites States of America.

This application is a continuation-in-part of my prior application Ser. No. 262,735, filed June 14, 1972 abandoned in favor of this application on June 9, 1975, for Composition For Use Particularly As Fish Food, And Method For Preparing The Same.

This invention relates to water stable starch-lipid compositions suitable for many uses, a preferred use being food for water animals, e.g., fish, and to a method for preparing such compositions.

A preferred embodiment of the invention is a fish food comprising starch and lipid material which may, if desired, be supplemented by further nutrient and/or flavoring constituents and which is especially suitable for the feeding of aquarium fish, i.e., fish which are confined to aquariums or which live under or are subjected to similar or comparable environmental conditions.

BACKGROUND OF THE INVENTION

Various compositions heretofore utilized as food material for fish maintained in aquariums or under similar environmental conditions have long been recognized as lacking properties desirable for maintenance of the fish in healthy state for long periods of time. Such compositions have generally been composed of mixtures having a lower percentage of fat than recent studies show to be conductive to healthy growth of the fish. In particular it has been recognized by those skilled in the art that the aqueous environment in which fish live in aquariums is such an efficient heat-transfer medium that the utilization of protein by fish and their growth rate are limited by the relatively low available energy content of their food. In cases where fish have become sickly because of a diet too low in fat, they can at times be nourished back to healthy state by feeding them corn meal, a source of carbohydrate and protein, soaked in corn oil. This procedure indeed often results in dramatic growth rates of the fish.

Where corn meal soaked in corn oil is used to feed fish in aquariums, however, the water is required to be changed at frequent intervals (approximately every several hours) due to the fact that the film of fat which forms on the surface when the feed is placed in the water constitutes an oxygen barrier, thus inducing bacterial growth, which clouds the water and further depletes the oxygen content of the water that the fish need in order to live.

There are suggestions and proposals in the prior art of compositions comprising carbohydrate material and fatty or protein material and methods of making them, sometimes in the form of discrete particles. Among such suggestions and proposals are the following:

1. Suzuke, U.S. Pat. No. 1,083,769, Jan. 6, 1914, pertaining to a food for fish or animals which is made by boiling fish in water, pressing the liquid out of the boiled fish, extracting oil from the water and then mixing the water with starchy material to form a paste which is dried.

2. Hamburg, U.S. Pat. No. 1,124,611, Jan. 12, 1915, pertaining to compositions composed of fats or fatty oils in combination with highly concentrated malt extract.

3. Dunham, U.S. Pat. Nos. 1,431,938 and 1,432,057, both dated Oct. 17, 1922, and both relating to shortening agents composed of dry pulverulent mixtures of edible oils and starch material. In U.S. Pat. No. 1,431,938 the starch material is boiled in water to form what is substantially a solution, oil is emulsified with the solution in a proportion of two parts oil to one part starch, and the emulsion dried. In U.S. Pat. No. 1,432,057 the starch is mixed with cold water so as not to break the starch granules, oil is emulsified therewith in a proportion varying from 20% oil to 80% starch to 70% oil to 30% starch, and the emulsion dried at low temperature. The object is to produce a powder that will release its oil when it is mixed with flour, liquids and the ingredients used in making bread, biscuits, cakes and pastry.

4. Yudowitch, U.S. Pat. No. Re 16,919, Mar. 20, 1928, relating to an edible fat that has been obtained by boiling fat with onions, strained and cooled until hardened.

5. Eshbaugh, et al., U.S. Pat. No. 2,385,068, Sept. 18, 1945, which relates to a product containing about 20–25% protein, 5–15% fat, and 25–50% cereal. It comprises cooking and partially dehydrating starch and protein containing materials to a moisture content of about 33–45%, comminuting the partially dried and cooked material and then completing the drying of the comminuted product.

6. Kimball et al., U.S. Pat. No. 2,471,435, May 31, 1949, relating to dried powder ingredients useful in food mixes, particularly dry salad dressings, and consisting of particles of fat globules and egg fractions encysted with a gelatinized starchy substance and sugar.

7. Hintz et al., U.S. Pat. No. 2,554,143, May 23, 1951, pertaining to a dry pudding composition comprising pregelantinized pudding starch and an oleaginous material.

8. Bernhart et al., U.S. Pat. No. 2,611,706, Sept. 23, 1952. This relates to a food composition wherein milk solids are combined with a carbohydrate such as lactose, dextrine, insulin, or the like, and a fat component consisting of a blend of a plurality of fats of specified fatty acid content.

9. Schoch et al., U.S. Pat. No. 2,876,160, Mar. 3, 1959. This relates to compositions in dry, free-flowable form. It discloses water-insoluble liquids or solids imbedded or dispersed in a continuous starch matrix in order to protect the dispersed material from oxidation by air, chemical changes, and the like.

10. Ohtaki, U.S. Pat. No. 3,007,798, Nov. 7, 1961. This patent concerns preparation of corn powder by spray drying of an emulsion of ground corn and an edible fatty material. The fat particles present in the product are individually coated with a film of sweet corn protein and amylaceous substance of the sweet corn.

11. Colby, U.S. Pat. No. 3,257,213, June 21, 1966, pertaining to a method of preparing high shortening containing pastry mix which has a weight ratio of starch to shortening in the range of 1:1 to 4:1 and which is made by mixing the starch and shortening in the stated proportions with sufficient water to form a homogeneous slurry and spray drying this slurry to form the dry particles.

12. Marotta et al., U.S. Pat. No. 3,300,319, Jan. 24, 1967, pertaining to a solid sauce base comprising an edible lipid intimately admixed with a starch conversion product consisting of dextrines and oxydized starches having a water fluidity value of at least 65 as determined by the test described in the patent.

13. Kessinger, U.S. Pat. No. 3,396,035, Aug. 6, 1968. In this patent there are disclosed non-caking shortening compositions utilizing up to 80% by weight of shortening and not less than 20% gelatinized starch of specified particle size, bulk density, cold water solubility and moisture content. The gelatinized starch serves as a fat absorbent in dry bakery mixes.

14. Stein, U.S. Pat. No. 3,483,002, Dec. 9, 1969, pertaining to a gelatinous coloring composition comprising a food color, a sugar, an edible gum, a hydrogenated vegetable oil as a fusing agent which is solid at room temperature and a binder of gelatin or starch.

15. Wurzburg et. al., U.S. Pat. No. 3,499,962, Mar. 10, 1970. This patent discloses encapsulation of water-insoluble materials such as vegetables, oils, perfumes, vitamins, etc., in the dried product of an emulsion, the continuous phase of which is an aqueous solution of an amylose resulting from fractionation of starch, or of mixtures of low amylose starch with starch containing at least 40% amylose, to provide a protective shell for the encapsulated water-insoluble material. The patent mentions (col. 5, line 45) use of such encapsulated paticles in animal feeds.

16. Maloney et al., U.S. Pat. No. 3,505,076, Apr. 7, 1970. This relates to production of a food product by impregnating a puffed cereal matrix, composed of cereal grains or cereal doughs, with a starch-fat slurry, to coat the surface of the matrix.

17. Rock et al., U.S. Pat. No. 3,518,092, June 30, 1970, relating to a sugar-dusting composition comprising a powdered mixture of 53–92.5% sugar, 4–30% starch, 2–8% shortening and 0.5–9% of waxy material.

None of these proposals pertains to a water stable starch-lipid composition suitable for the uses to which the present invention can be put nor to the methods for preparing such compositions according to the method of the present invention.

DESCRIPTION OF EMBODIMENTS OF THE INVENTION

The composition of the invention which may be in particulate form such as granules, flakes, powder and the like, comprises starch, i.e., a carbohydrate-containing material, and a lipid-containing material characterized by immobility of the lipid in water. By immobility of the lipid in water is meant that the lipid component of the composition is not released or separated from the starch or carbohydrate-containing material when the product is placed in water at normal or ambient temperatures. While ambient temperatures vary widely in different parts of the world, there is a comparatively narrow temperature range within which animals are found for which the composition of the invention is adapted for use as a food. In general, this temperature is well below 50° C. and the composition of the invention is stable, i.e., the fat is immobile in water, up to about that temperature. This means that substantially no fat film will form on the surface of a body of water into which the composition of the present invention is introduced, e.g., as a food for fish or other aquatic animals.

The method of the invention comprises preparing a slurry of properly treated carbohydrate-containing material and the lipid-containing material in water, heating the slurry to a temperature within the range of about 100° to 121° C, and reducing the moisture content of the slurry in certain ways to convert it into the solid state. Preferably the moisture reduction or drying process converts the slurry into particulate form, such as powder, granules, flakes and the like, which is particularly suitable for use as a food for fish and other aquatic animals, e.g., by throwing a quantity thereof into an aquarium or the like. The particulate product produced in accordance with the method of the invention exhibits substantially no tendency to foul the water in aquaria in which it is used as a food for fish and the other aquatic animals. Such aquaria or tanks may be of the relatively small capacity sizes maintained by individuals in their homes, offices and other quarters to display pet fish of various species and varieties or of the large capacity sizes maintained in zoological gardens and like public places as exhibits of various species and varieties of fish and other aquatic animals. The specific mechanism by which the lipid content of the composition is immobilized, bound or tied up therein so that it is not released or separated from the starch component when the product is placed in water is not understood but the fact is easily demonstrable by observation and by test as set forth hereinafter.

The composition of the invention is not limited to the two ingredients mentioned, i.e., to the carbohydrate-containing ingredient and the lipid-containing ingredient. It may also contain proteins and other animal nutrients as more fully described hereinafter.

The composition of the invention is particularly advantageous as a fish food comprising starch and fat in a proportion of about 8–20% by weight of the composition and which is characterized by the immobility of the fat, i.e., when the fish food is thrown into water there is substantially no fat film formed on the surface of the water by liberation of the fat from the food. In a preferred embodiment of the fish food the composition contains added nutrient materials and flavoring constituents such as protein, vitamins, minerals and the like. Fat is a high energy material, i.e., it contains greater energy per gram than carbohydrates despite the fact that compounds making up the fat and carbohydrate consist largely if not entirely of the elements carbon, hydrogen and oxygen. It has been found by test that a food comprising starch and fat in the proportions stated will provide a more healthful diet for fish than compositions containing less than about 8% fat. If the fat content of a composition substantially exceeds about 20% by weight thereof the immobilization of the entire fat content is less efficient and fouling of the water into which the material is introduced becomes more serious as the content of the fat increases above about 20% by weight of the composition.

The composition of the invention is suitable for use as a food for tropical, fresh water and salt water fish as well as crustaceans. In addition to the advantageous property of immobility of the fat on introduction into water, the product of the invention also has extended shelf life as compared with starch-fat compositions in which the fat is not immobile.

In the practice of the invention, the carbohydrate or starch component to be used in the preparation of the composition may be any vegetable starch suitable for use in the production of an animal feed. Among the preferred starch-containing materials which may be employed as such component are corn starch, rice starch and sweet potato starch. Sweet potato starch is particularly advantageous.

Aside from the qualities which render starch suitable and desirable for use in preparing an animal feed composition of the character herein-described, the starch-containing material to be utilized in the preparation of the composition of the invention should be characterized by the property that when cooked in water, the starch cells are made readily susceptible to rupture, e.g., when subjected to shearing stress, as in a Waring blender. Rupture of cell walls makes starch grains available for immobilizing fats and appears to be desirable in carrying out the present invention. With a blender, or the like, virtually all the large storage cells are ruptured but smaller structural cells, which contain some starch, may remain intact. When the cells are ruptured, the starch (carbohydrates) and the native amylases come into intimate contact with each other, so that starch hydrolysis will be initiated, particularly at elevated temperatures. This hydrolysis reaction, as known from the work of Hoover and Harmon, Food Technology, Vol. 21, No. 11, pages 115–118, (1967), is particularly rapid at temperatures between approximately 75° C., when starch gelatinization begins, and approximately 83° C. when the amylases are denatured.

Although it is preferred to cook the starch-containing material, for the reasons above set forth, it should be pointed out that with proper industrial equipment suitably designed for the purpose, it may be possible to grind the starch-containing vegetable material sufficiently fine to achieve rupture of most, if not substantially all, of the carbohydrate cells, and to heat the finely ground material sufficiently rapidly to avoid conversion (hydrolysis) of the starch into solubilized form. Desirably the amount of conversion is zero, although some conversion may occur without departing from the invention.

As will be understood from the foregoing, and from the more detailed description hereinafter, avoidance of conversion (i.e., starch hydrolysis) is important in order to keep the dissolved solids in the product low, and at the same time to keep the starch molecules large which appears to be a factor in achieving immobility of the fat in the present invention.

After cooking and/or subjecting the selected starch-containing vegetable material to shearing stress, e.g., by blending, the resultant puree, if more hydrolysis has occurred than desired, may be centrifuged or otherwise suitably treated to concentrate, i.e., to collect, the insoluble solids and to separate the solubles therefrom. In centrifuging the puree, the desired concentration of the insolubles may be achieved when the conditions employed are such as to subject the puree to centrifugal force within the range of about 3000 to 10,000 times gravity (x g.) for a period within the range of about 5 minutes to about 20 minutes.

The carbohydrate-containing solids, when prepared by any of the treatments described, comprise unhydrolyzed starch. The treatment of the starch cells liberates the starch grains, preferably without substantial hydrolysis which may be accomplished by carrying out any heating principally above the temperature at which associated enzymes such as amylase is denatured or destroyed, but if more hydrolysis occurs than desired, the insoluble fraction comprising the unhydrolyzed grains may be recovered as described for use in the process of the invention.

The lipid-containing component of the composition of the invention may be selected from any suitable vegetable or animal oil or fat desirable for use in an animal food composition. Among the materials which may be used as the lipid-containing component are, by way of example, peanuts, soy beans, corn oil, safflower oil, chicken fat and the like.

The relative proportions of nuts, beans and the like to provide the fat or lipid-containing material and of the starch-containing material may be about 1:1 to 1:2 on a weight basis. Nuts and beans also add protein which is a desirable ingredient. In the case, for example, of using sweet potato solids as the starch component, and peanuts as the source of the lipid component, an amount of sweet potato solids and of peanuts calculated to provide from approximately 8% to approximately 20% fat content in the final product, on the dry weight basis, has been found to constitute a highly acceptable fish food composition embodying the present invention.

The lipid-containing material, as for example, peanuts, are preferably ground and blended in water to form a smooth milk, i.e., a suspension or emulsion. The peanuts may suitably be utilized with the testa or skin skill on them. The aforesaid milk is then added to a weighed amount of the starch solids, e.g., as obtained by grinding alone, or by cooking and/or blending, and, if desired, also by centrifuging the cooked and blended starch puree in the manner above set forth. Generally speaking, the pellets recovered by centrifuging the puree under the conditions above described contain approximately 17% of solids.

To the mixture formed by adding the desired amount of starch solids to the suspension or emulsion of the selected lipid-containing material, such as peanuts, in water, there may be added, if necessary or desirable, a sufficient additional amount of water to form as thick a puree as can be conveniently stirred, e.g., by means of a Waring blender or the like. The puree is heated to a temperature slightly above 100° C. under superatmospheric pressure, as by means of a steam heated autoclave. To that end, the autoclave temperature may be permitted to rise to about 121° C., whereupon the supply of steam to the autoclave is terminated.

The thus heated puree is lightly stirred, either mechanically or by hand, and is then dried, e.g., on a drum dryer. The drum may conveniently be heated with steam at 60 p.s.i. The retention time on the drum dryer may suitably be from 20 to 80, preferably about 45, seconds.

In order to illustrate more specifically the various features of the invention, a number of examples are set forth herebelow:

EXAMPLE I

A batch of sweet potatoes was cooked and then slurried in water. The slurry was centrifuged under the conditions described above to remove solubles and form the sweet potato starch concentrate into pellets. 18.8 grams of peanuts were blended into a slurry with water and stirred with 47 grams of sweet potato pellets (thus providing approximately a 20% fat content on the dry weight basis) and a sufficient quantity of water to make a puree. The puree was heated to 120° C. in an autoclave. The thus heated puree, after lightly stirring the same, was then dried on a drum dryer heated by steam at 60 p.s.i., for a retention time of 45 seconds. The resultant product was in the form of a dry flake-like powder comprising sweet potato starch and approximately 20% fat and was characterized by immobility of the fat or lipid component.

It was found from visual observation that the finished product appealed greatly to fish, including particularly fish which are confined in aquariums, and that the fish thrived in health and growth when fed a diet of this product. After the product had been introduced into a domestic size aquarium, no fat film could be observed on the surface of the water.

EXAMPLE II

A product was prepared from sweet potato solids and peanuts in the same manner as described in Example I, except that the amount of the peanuts utilized was decreased to an amount such as to provide in the final product approximately 10% fats. The final product thus obtained exhibited similar appeal and advantageous properties as a food for fish maintained in aquariums as the product of Example I.

EXAMPLE III

The product of this Example was likwise prepared from sweet potato starch solids and peanuts by the same procedure as Example I except that an amount of peanuts relative to the amount of sweet potato starch solids was utilized to provide approximately 15% fats in the final product. The resultant product obtained by the procedure of this Example exhibited substantially the same properties and advantages as the products produced by the procedures of Examples I and II.

It was also observed from other products produced by the same procedure except that the fat content exceeded approximately 20% of the weight of the mixture with sweet potato starch solids, that the entire fat content is no longer immobilized as evidenced by a tendency toward the formation of an oil film on water in which the food product is placed.

Peanuts contain carbohydrates and protein in addition to fat. Actual determination of the protein content of the foods made as described in the above Examples I, II and III was not undertaken but is estimated from reported values to range from about 12% to 15%. Soybeans and other legume seeds also contain carbohydrates, proteins and fats.

Additional food formulations were prepared by the above-described procedure but with the addition of chicken muscle to increase the protein content of the food to the order of 20 to 25%. The foods comprising the above-described starch-lipid compositions and containing protein in the order of 20 of 25% by weight of the product are particularly suitable for feeding fish of carnivorous species.

For the latter purpose particularly, suitable formulations were also prepared by the herein described procedure from starch and lipid-containing components to which beef blood was added in an amount sufficient to provide in the finished product a protein content of approximately 25% by weight of the product. Other protein materials which may be used satisfactorily with products such as those of Examples I, II and III include shrimp, squid, fish roe (for protein and fat) and whey fermented yeast.

In addition to the products prepared from sweet potato solids and peanuts as described in Examples I, II and III, compositions particularly suitable for use as food for fish maintained in aquariums were also prepared in like manner by utilizing the following combinations of materials:

A

Sweet potato starch solids
Soy beans
Peanuts

B

Sweet potato starch solids
Peanuts
Whey fermented yeast product known commercially "Wheast"

C

Sweet potato starch solids
Peanuts
Chicken fat

D

Corn starch
Soy beans
Peanuts

E

Corn starch
Safflower oil
Chicken muscle

Other specific formulations embodying the present invention are the following:

| Ex. No. | Ingredients (Parts by Weight | Estimated Carbohydrate | Composition Fat | (percent) Protein |
|---|---|---|---|---|
| IV | Corn 1 Soybean 1 | 53 | 11 | 22 |
| V | Corn 2 Peanut 1 | 54 | 19 | 15 |
| VI | Corn 2 Soybean 1 Peanut 1 | 49 | 15 | 20 |
| VII | Sweet Potato 1 Corn 1 Soybean 1 Peanut 1 | 46 | 18 | 18 |

The food formulations embodying the present invention foul water in aquaria much less than commercial fish foods.

An objective method of measuring the degree of fouling of the water in an aquarium by fish food introduced into it may be carried out by adding two hundred and fifty-milligrams of the food to 500 milliliter of clear pond water and measuring the amount of oxygen in the water periodically during a prolonged period, e.g., 60 to 100 hours, by means of an oxygen electrode. By utilizing this method of oxygen measurement it is possible to evaluate and compare the tendency of various food formulations to foul the water. Table I compares the formulations of Examples IV, V, VI and VII with three of the most popular commercial fish foods by this test using 500 ml pond water to which 0.5 gram of the respective products were added:

TABLE I

| Example No. | Dissolved Oxygen At Partial Pressure $O_2$ | | |
|---|---|---|---|
| | 0 Time | 60 Hours | 84 Hours |
| IV | 13.25 | 0.80 | |
| V | 12.75 | 2.20 | |
| VI | 12.80 | 0.75 | |
| CA | 12.00 | 0.04 | |
| CB | 12.25 | 0.025 | |
| CC | 11.60 | 0.02 | |

TABLE I-continued

| Example No. | Dissolved Oxygen At Partial Pressure O$_2$ | | |
|---|---|---|---|
| | 0 Time | 60 Hours | 84 Hours |
| CA | 10.80 | | 0.25 |
| CB | 10.30 | | 0.25 |
| CC | 10.40 | | 0.25 |
| VII | 11.00 | | 2.20 |

In carrying out the tests reported in Table I, the products of Examples IV, V and VI were compared for 60 hours with three commercial products identified as CA, CB and CC. The very substantially higher amount of dissolved oxygen in the aquaria into which the products of Examples IV, V and VI were introduced as compared with the aquaria into which the commercial products had been introduced is clearly shown in the Table. This is evidence of the fact that the products of the present invention cause much less fouling of water in aquaria than commercially available products.

In a second test carried out for 84 hours the same three commercial products were tested under the same conditions as Example VII with the same result, viz., the oxygen content in the tank into the product of Example VII had been added was very much higher than the oxygen content of any of the tanks to which the commercially available products had been added. Moreover the case of CB, a very foul odor had been generated in the tank after only 20 hours. A very foul odor was also present in the tank to which CA had been added at the end of the 84 hour test. The tank to which CC had been added had a very thick slime at the end of the 84 hour test. The tank to which the product of Example VII was added had no foul odor and no slime at the end of the test.

By means of the foregoing test, it was found that a satisfactory fish food embodying the invention can be prepared from cooked sweet potatoes and peanuts without centrifuging the sweet potato puree. It was found that a product thus prepared with only cooked sweet potatoes and peanuts consumed less oxygen than any of the commercial feeds tested, although it was not as good in this respect as was the product made from the same starting materials but with removal of the sweet potato solubles.

In the practice of the invention as above described, feeds were prepared from lipid and starch-containing components such as those hereinable mentioned, with and without modification by admixture with proteinaceous components such as those enumerated above. It was found, for example, that a feed prepared from the ingredients enumerated in formulation E, supra, exhibited quite acceptable properties as an energy and protein source. It may also be supplemented by minerals, vitamins and other food supplements for special diets if it is considered to be somewhat deficient in such other nutrients. Flavoring constituents may also be incorporated.

Feeds prepared in accordance herewith from rice and corn starch-peanut components were found not to be substantially different from those prepared with sweet potatoes as the source of the starch. It was also noted, in the case of feeds prepared with the use of corn as the source of the starch, the feeds were somewhat, but not greatly, improved by centrifuging the pureed corn.

Of the various formulations above set forth, the compositions which appeared to have the most desirable properties were the ingredients of Examples B, i.e., from sweet potato solids having a realively low content of soluble carbohydrate, peanuts, and the commercial whey fermented yeast product. The latter contains about 10% soluble carbohydrate, but this can readily be eliminated by mixing the product as obtained on the market with water, allowing the insoluble constituents to settle, and collecting the insoluble constituents for use in the compositions of the invention.

It will be seen from all the foregoing that compositions are provided having utility as a feed, characterized chiefly by the feature that it utilizes starch to immobilize or bind a relatively high proportion of fat to increase energy provided by the food, and characterized by the further feature that it yields a food which is so low in solubles that the oxygen content of the water in which it is suspended decreases at a much slower rate than fish food products of the prior art.

It should also be evident from the description herein that besides the starch sources above mentioned, various grains can be used to provide starch. The grains when treated as described have lower soluble carbohydrates as compared to sweet potatoes so that centrifuging of the starch-containing slurry has less advantage than slurries obtained from sweet potatoes. It should be further evident that besides peanuts and soybeans, other oil seeds may be used to provide the lipid component of the composition.

It should be still further evident that in preparing the feed composition of the invention fairly large amounts of protein can be incorporated with the benefits incident to its presence and without deleteriously affecting its other desirable properties. Other nutrients and flavoring materials may likewise be incorporated, if desired.

Although the invention has hereinabove been described with particular reference to its use in fish food compositions, more specifically its use as feed for fish confined in aquariums, it will be recognized by those skilled in the art that the invention possesses utility for other purposes. Thus, among such other purposes, there may be mentioned dry lubricants, textile finishing compositions, anti-static compositions for treating textiles, and compositions for use in oil recovery, as from oil spills at sea.

What is claimed is:

1. A composition in solid state comprising the water-insoluble solids portion of vegetable starch and lipid-containing material from the class consisting of vegetable and animal oils and fats suitable for use in an animal food composition characterized by immobility of the lipid in water.

2. The composition of claim 1, wherein the said lipid content comprises approximately 8% to 20% by weight of the said solids portion of the composition.

3. A fish food comprising the water-insoluble solids portion of vegetable starch and a lipid-containing material from the class consisting of vegetable and animal oils and fats suitable for use in an animal food composition, the lipid content of said food comprising from about 8% to about 2% of said solids portion of said food.

4. A fish food as set forth in claim 3 in dry particulate form characterized by immobility of the lipid in water.

5. A fish food composition as set forth in claim 3 in which the lipid-containing material is selected from the group consisting of peanuts, soybeans, corn oil, safflower oil and chicken fat.

6. A fish food composition as set forth in claim 3 in which the starch is selected from the group consisting of sweet potato starch, corn starch and rice starch.

7. A fish food composition as set forth in claim 3 in which the starch is selected from the group consisting of sweet potato starch, corn starch and rice starch, and the lipid-containing material is selected from the group consisting of peanut oil, soybean oil, corn oil, safflower oil and chicken fat.

8. A fish food composition as set forth in claim 3 which contains also a proteinaceous material as an ingredient thereof.

9. A fish food composition as set forth in claim 8 in which the proteinaceous material is present in the amount of approximately 12% to 25% by weight of the composition.

10. A fish food composition as set forth in claim 8 in which the proteinaceous material is selected from the group consisting of peanuts, soybeans, shrimp, squid, roe, chicken muscle, beef blood and whey fermented yeast.

11. A fish food composition as set forth in claim 5 in which said starch comprises sweet potato solids, and said lipid-content comprises a mixture of peanut oil and chicken fat.

12. The method of preparing a starch-lipid composition comprising mixing unhydrolyzed starch with lipid-containing material and water to form a slurry, subjecting the slurry to shear stress, heating the resulting slurry to a temperature above 100° C. under superatmospheric pressure and drying the heated mass to solid state.

13. The method of preparing a starch-lipid composition comprising forming a slurry of liberated starch grains with lipid-containing material, heating the slurry to a temperature above 100° C. under superatmospheric pressure, and drying the heated mass to solid state.

14. The method of preparing a starch-lipid composition comprising treatment of starch cells to liberate starch grains without substantial hydrolysis, forming a slurry of said liberated starch grains and lipid-containing material in water, heating the slurry to a temperature within the range of 100° C. to 121° C. under superatmospheric pressure, and drying the heated mass to solid state.

15. The method as set forth in claim 14 in which said treatment is by subjecting the cells to heating above the temperature at which associated enzymes are destroyed.

16. The method as set forth in claim 14 in which said treatment is by subjecting the cells to shear stress.

17. The method as set forth in claim 14 in which the drying of the heated mass is solid particulate state.

18. The method of preparing a starch-lipid composition comprising the steps of:
 a. Cooking starch-containing vegetable material in water at a temperature in the range of approximately 100° to 130° C;
 b. Forming the cooked starch-containing vegetable material into an aqueous slurry;
 c. Forming an aqueous slurry of lipid-containing food material;
 d. Mixing said slurry of starch-containing material with said slurry of said lipid-containing food material in a proportion such as to provide a lipid content within the range of about 8% to about 20% in said mixture on the dry weight basis;
 e. Heating said mixture under superatmospheric pressure above 100° C; and
 f. Drying the heated mass to a solid state.

19. The method of preparing a fish food comprising the steps of:
 a. Cooking starch-containing vegetable material in water at a temperature in the range of approximately 100° to 130° C;
 b. Forming the cooked starch-containing vegetable material into an aqueous slurry;
 c. Concentrating the slurry to compact the solids thereof into pellets;
 d. Separating the pellets from the aqueous medium containing the water-soluble constituents of said starch-containing vegetable material;
 e. Forming an aqueous slurry of a lipid-containing solid food substance;
 f. Mixing said pellets with the aqueous slurry of said lipid-containing food substance in a proportion such as to provide a lipid content within the range of about 8% to about 20% in said mixture on the dry weight basis;
 g. Heating said mixture under superatmospheric pressure at a temperature over 100° C.; and
 h. Drying the heated mass into particulate form.

20. The method as set forth in claim 19 in which the heating of said mixture is conducted in an autoclave at a temperature of approximately 121° C.

21. The method as set forth in claim 19 in which the heating of said mixture is conducted in an autoclave by application of heat thereto until the autoclave temperature thereof has reached 121° C., and thereupon cutting off the application of heat to the autoclave.

22. The method as set forth in claim 19 in which the step of concentrating said slurry of cooked starch-containing vegetable material is effectuated by centrifuging said slurry at a centrifugal force within the range of about 3,000 to 10,000 x g. for a period within the range of about 5 to 20 minutes.

* * * * *